June 20, 1967  F. MISCHE  3,326,104
STRUCTURE FOR IMAGING OBJECTIVE SCALES
IN THE VIEWFINDER OF A CAMERA Filed Feb. 26, 1965

F. MISCHE 3,326,104

STRUCTURE FOR IMAGING OBJECTIVE SCALES IN THE VIEWFINDER OF A CAMERA

Filed Feb. 26, 1965

FIG. 14 ived June 20, 1967

3,326,104
STRUCTURE FOR IMAGING OBJECTIVE SCALES
IN THE VIEWFINDER OF A CAMERA
Friedrich Mische, Braunschweig, Germany, assignor to
Voigtlander A.G., Berlinerstrasse, Braunschweig, Germany, a corporation of Germany
Filed Feb. 26, 1965, Ser. No. 435,191
Claims priority, application Germany, Mar. 2, 1964,
V 25,538
10 Claims. (Cl. 95—11)

ABSTRACT OF THE DISCLOSURE

A camera having a structure which directs to the eye of the operator, when looking into the viewfinder, an image of scales at the objective, such as scales indicating exposure time and aperture sizes. The conventional viewfinder of the camera remains unchanged. Situated in front of the viewfinder of the camera is a housing having a window through which light enters into the interior of the housing to move therethrough into the viewfinder, so that the object which is seen through the viewfinder is also seen through the window of the housing at the front of the viewfinder. This housing carries over the optical axis of the viewfinder, which is above the objective of the camera, a first reflecting structure which is situated in the region of an edge of the front window of the viewfinder of the camera, and this first reflecting structure which is in the interior of the housing at the front of the viewfinder reflects an image of the objective scales downwardly across the interior of the housing and across the optical axis of the viewfinder. There is also situated in the interior of this housing a second reflecting structure, and this second reflecting structure is located beneath the optical axis of the viewfinder and in the region of another edge at the front window of the camera viewfinder. The second reflecting means receives the image from the first reflecting means and directs it into the viewfinder so that it will become visible to the operator when the operator looks through the viewfinder to the object which is to be photographed.

---

The present invention relates to cameras.

In particular, the present invention relates to cameras having objectives provided with adjustable structure for setting the camera so as to determine the extent to which film therein is exposed. This adjusting structure which forms part of the objective of the camera may include, for example, structure for setting the exposure time and aperture, and this latter structure will include suitable scales capable of indicating the settings of the camera.

A camera of this type will conventionally include a viewfinder means through which the operator looks in order to view the object which is to be photographed, and the present invention deals in particular with a structure for providing in the viewing field of the viewfinder an image of the settings of the scales of the objective assembly.

It is, of course, highly desirable in cameras of this type to provide, beside an image of the object which is photographed, an image of the settings such as the exposure time and aperture settings, the latter image preferably being situated beside the image of the object which is to be photographed. In addition, it is often desirable to provide the operator with images of settings in addition to the exposure time and aperture, such as settings indicating the distance between the object and the camera, and the depth of field. For this purpose, many different types of devices are known, but many of these conventional devices are situated within the camera housing and require special optical elements for directing an image of the scale settings into the viewfinder. Thus, a very special viewfinder construction is required for this purpose. Furthermore, a pair of indicating structures are required for indicating the settings of the objective, since the indications of these settings of the objective should be visible at the exterior of the objective on the scales which surround the objective as well as in the viewfinder. This duplication of indicating structure provides a highly undesirable complication in the structure of the camera.

It has already been proposed to avoid the above drawbacks by providing a camera of the above type with a structure rendering the objective scales visible in the viewfinder without requiring any indicating elements in the interior of the camera. With this known construction there is provided in the plane of the front window of the viewfinder, underneath the latter, a prism which directs an image of the scales of the objective into the ocular of the viewfinder. Thus, there is provided in this way beneath the viewfinder image an image of the scale graduations. This construction, however, has the disadvantage of requiring a relatively high prism to be situated beneath the front window of the viewfinder, undesirably increasing the total height of the viewfinder. Furthermore, this solution to the problem can be satisfactorily used only with scales which make a relatively large angle with the optical axis of the objective. The situation of the scales at such steep angles, however, renders the direct reading of the scales at the exterior of the objective difficult to carry out.

It is also known to provide cameras with a second ocular situated beneath the ocular of the viewfinder and through which it is possible to see scale values. However, with this construction it is not possible for the operator to view simultaneously the object which is to be photographed and the scale settings.

Of course, reflex cameras are known where there is provided in front of the conventional viewfinder prism a second prism capable of providing an image of the scales surrounding the objective, in the first prism at the viewing window of the viewfinder. With reflex cameras the mounting of this additional optical element for providing an image of the scales is relatively simple. Inasmuch as the path of light rays for the viewfinder extends through the interior of the camera into the viewfinder prism, the entire front side of this latter prism is available for mounting of the additional optical elements for providing the image of the scales. Such a construction will have no undesirable influence on the viewfinder image, which, as is well known in reflex cameras, is derived through the camera objective itself. This viewfinder prism of such reflex camera requires, in any event, a relatively large camera height, so that with respect to the height of the viewfinder there is available sufficient space for the additional elements required for the scale images. Moreover, the viewfinder prism of a reflex camera is conventionally inclined upwardly and rearwardly so that at this front side of the latter prism there is sufficient space for the additional elements which are not, in this case, required to project forwardly to an undesirably large extent over the camera housing.

However, when dealing with a viewfinder which has a front window through which light enters the viewfinder, entirely different conditions are encountered. In this case, it is not possible to arrange additional elements above or below the viewfinder without increasing the height of the camera. Moreover, there is no free front surface available for mounting the additional elements, since the light enters the viewfinder at the front thereof, in contrast to the arrangement in reflex cameras.

It is, therefore, a primary object of the present invention to provide for a camera which has a viewfinder through which light enters at a front window thereof, an optical structure which will provide an image of the objective scales without, however, increasing the height of the viewfinder and thus without providing any essential increase in the size of the camera or in any way undesirably influencing the viewfinder image.

Thus, it is an object of the invention to provide the operator not only with an image of the object being photographed, by way of a conventional viewfinder, but also simultaneously with an image of the objective scales without requiring any indicating structure in addition to the scales themselves which are easily visible at the exterior of the cemara, and at the same time without increasing the height of the viewfinder beyond the height it normally has without any structure for providing an image of the objective scales.

Furthermore, it is an object of the present invention to provide in the viewfinder an image of the objective scales without, however, disturbing the image of the object which is visible in the viewfinder.

Furthermore, it is an object of the present invention to provide a structure which will produce an easily visible, clear image of the scale settings.

The objects of the present invention also include the provision of a structure which does not require any change in the construction of the viewfinder itself, so that the structure of the invention can easily be incorporated into cameras which have already been manufactured, without any change in the structure thereof.

Also, it is an object of the invention to provide a structure which will provide an image of the objective scales in the viewfinder without interfering with other information seen in the viewfinder, such as frame limits which are rendered visible in the viewfinder.

Also, it is an object of the present invention to provide an adjusting and fixing structure capable of adjusting the device of the invention to provide an accurate sharp image of the objective scales and then capable of fixing this structure in its adjusted position.

Primarily there is provided with the structure of the invention at the edge of the front window of the viewfinder, over the optical axis of the viewfinder, a first reflector means which will reflect an image of the objective scales downwardly across the optical axis of the viewfinder, and beneath this latter optical axis there is situated, also at the edge of the front window of the viewfinder, a second reflector means which receives the scale image from the first reflector means and which directs this image to the eye of the operator at the rear window of the viewfinder.

The invention is illustrated by way of example in the accompanying drawings which form part of the application and in which.

Figure 1:
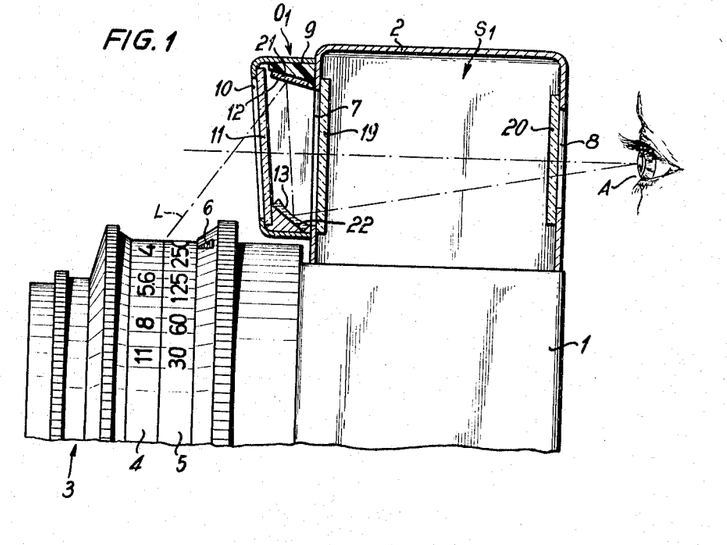
FIG. 1 is a fragmentary side elevation of a camera provided with the structure of the invention, the viewfinder of the camera and the structure of the invention which cooperates with the viewfinder, being shown in section in FIG. 1.

The camera which is fragmentarily illustrated in FIG. 1 includes a housing 1 carrying a hollow enclosure or cap 2 which is situated on top of and fixed to the housing 1, as is well known in the art. The housing 1 has a front wall which carries the objective means 3 which projects forwardly from the front wall of the camera housing 1, and this objective structure is entirely conventional. The objective assembly 3 includes the rotary scales 4 and 5 which have graduations which cooperate with a stationary index 6. In the illustrated example the scale 4 is used for adjusting the aperture, while the scale 5 is used for adjusting the exposure time. These scales 4 and 5 extend at least part of the way around the optical axis of the objective means 3 and the scales are visible at the upper part of the objective where the index 6 is also situated. This objective means 3, includes in a conventional manner, the usual objective structure and shutter assembly.

The hollow cap 2 of the camera serves to mount the viewfinder $S_1$, and this viewfinder $S_1$ is provided at its front end with a front window 7 through which light enters the viewfinder means $S_1$. At its rear end the viewfinder $S_1$ is provided with a rear window 8 through which the operator can look into the viewfinder, the eye A of the operator being shown in FIG. 1 just behind and in alignment with the rear window 8.

This viewfinder $S_1$ is provided with an assembly $O_1$ according to the present invention, and this optical structure $O_1$ provides in the viewfinder an image of the portions of the scales 4 and 5 which are in the region of the index 6, an image of the index 6 also being provided in the viewfinder.

The optical device $O_1$ includes a housing 9 which is fixed to the cap 2 in front of the window 7. The housing 9 has a window 10 through which light enters the housing 9 to pass therethrough before reaching the window 7. The window 10 of the housing 9 is covered by a transparent plate 11.

Within the housing 9 is situated a first reflecting means provided with a reflecting surface 12, and this first reflecting means is situated above and beyond the periphery of the window 7 of the viewfinder in the region of the edge thereof. This first reflector means is situated at the side of the window 7 which is distant from and opposite to the index 6. As may be seen from FIG. 1, the first reflecting means 12 is situated above the optical axis of the viewfinder, while the objective means is situated below this optical axis. The housing 9 carries a second reflecting means which is situated beneath the optical axis of the viewfinder to receive the image from the first reflecting means and to direct the image through the viewfinder to the eye A of the operator, and this second reflector means has a reflecting surface 13 situated at the side of the window 7 opposite from the reflecting surface 12, this second reflecting means also being situated in the region of the edge of the front window 7 of the viewfinder. The reflecting surfaces 12 and 13 are so arranged with respect to each other that they will direct the light ray L from the scales along the dot-dash line path indicated in FIG. 1. In this way it is possible for the operator to observe the scale settings.

Part of the viewing field of the viewfinder is obstructed by the objective 3, and ordinarily this obstructed portion of the field is blacked out. The part of the viewfinder field which is obstructed by the objective 3 is indicated by the shaded area 14 in FIG. 2. The optical structure of the invention is arranged in such a way that the images of the scales and index are situated precisely at that part of the viewfinder field which would in any event be obstructed by the objective structure. This arrangement is apparent from FIG. 3 where the viewfinder image is shown. Along the lower edge of this viewfinder image there appears the image of the scales 4 and 5 which are indicated at 4′ and 5′ in FIG. 3. Also, the index 6 has its image indicated at 6′ in FIG. 3, so that in this way at the lower part of the viewfinder image which in any event would not provide part of the image of the object to be photographed there is situated the scale images with the structure of the invention.

Figure 4:
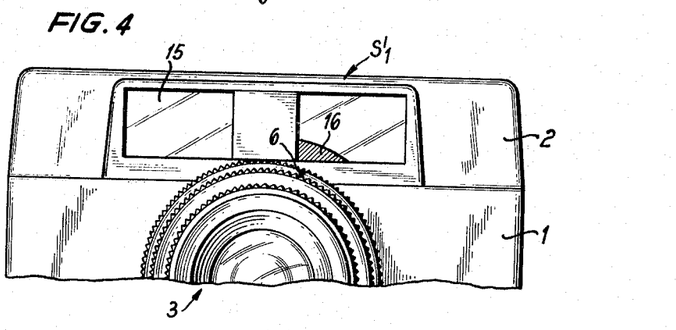
FIG. 4 is a fragmentary front elevation of another embodiment of a camera according to the present invention.

The optical structure of the invention can also be incorporated into a camera of the type shown in FIG. 4. This camera also has a housing 1 and a hollow enclosure 2 carried by the top part of the housing 1. Furthermore, the camera includes the objective means 3. However, it is to be noted that in FIG. 4 the viewfinder means S′₁ is laterally displaced with respect to the objective, so that on the other side of the objective it is possible to situate in the cap 2 a photocell 15 which forms part of a structure for measuring the light intensity. With the arrangement shown in FIG. 4, the objective 3 will obstruct only a corner of the viewfinder field, as shown by the shaded area 16 in FIG. 4. Thus, the optical structure of the invention is arranged to provide an image of the scales and index as indicated at 4″, 5″ and 6″ in FIG. 5, where it is apparent that these images are situated at a corner of the viewing field.

Figures 2, 3:
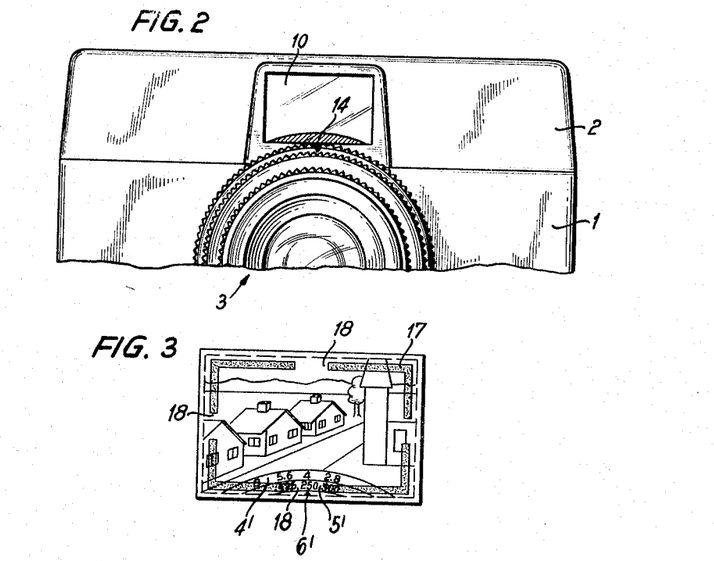
FIG. 2 is a front elevation of the camera of FIG. 1.
FIG. 3 is a representation of the image seen in the viewfinder of FIGS. 1 and 2.
Figure 5:
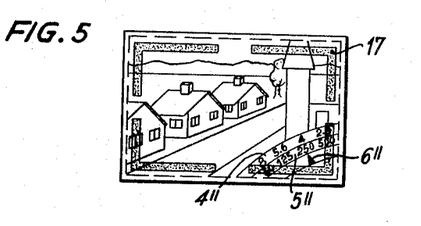
FIG. 5 is a representation of the image seen with the viewfinder of FIG. 4.

When the viewfinder is provided with a frame-limiting structure providing frame limiting images 17, as indicated in FIGS. 3 and 5, which are separated by interruptions, then the scale images of the invention are directed to one of these interruptions such as the interruption 18 shown in FIG. 3. In this way the framing limits indicated by the images 17 are not undesirably influenced by the scale images. With the arrangement of FIG. 5, the visibility of the framing images 17 is not undesirably influenced since the scale images are situated at a corner portion which is located within one of the angular framing images 17.

An optical structure according to the present invention provided with the pair of reflecting surfaces 12 and 13, can be combined with viewfinders of any construction. In FIGS. 1 and 6-12 are illustrated cameras with viewfinders of widely different construction, all provided, however, with, in principle, the same optical structure of the present invention for providing in the viewfinder an image of the objective scales. In these figures the same parts are designated by the same reference characters.

The viewfinder S₁ of FIG. 1 is a lens-less viewfinder whose front window 7 is covered by a transparent glass plate 19 and whose rear window 8 is covered by a further glass plate 20. The surface 12 of the first reflecting means takes the form of a flat mirror 21, while the surface 13 of the second reflector means takes the form of a concave mirror 22 which provides for the eye of the operator a sharp image of the scales.

Figure 6:
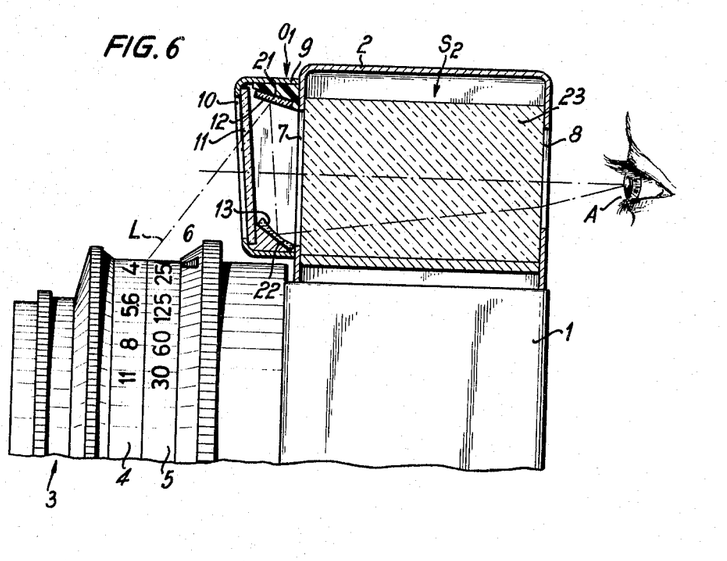
FIGS. 6–11 respectively show in partly sectional side elevation views different embodiments of cameras provided with structure according to the present invention.

In the camera of FIG. 6 the viewfinder S₂, which is also lens-less, includes a glass block 23. In this way it is possible to provide smaller dimensions for the viewfinder. The optical device of the invention has the same structure as that of FIG. 1 and is therefore also designated with the reference character O₁.

Figure 7:
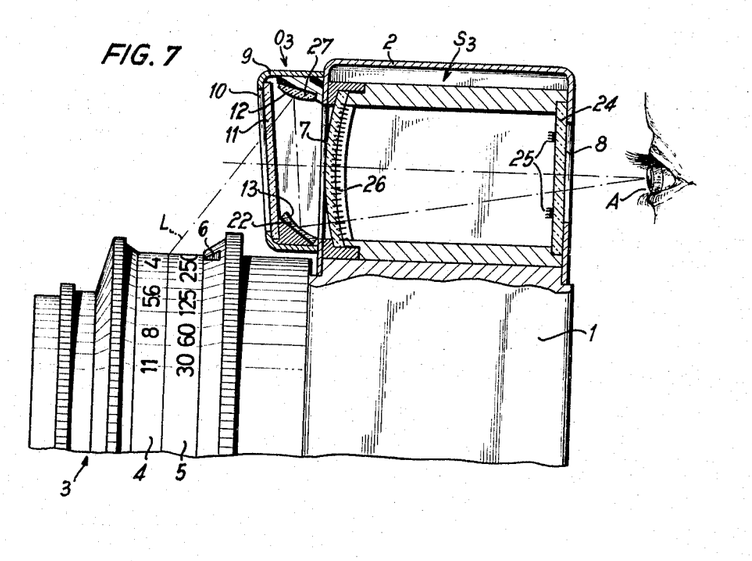

The camera of FIG. 7 has a viewfinder means S₃ whose rear window 8 is covered by a glass plate 24 on which a frame 25 is situated, this frame 25 being imaged in the viewing field by the semi-transparent hollow reflector 26 so as to provide the frame-limiting images 17 of FIGS. 3 and 5. An optical device O₃, according to the present invention, is combined with the view-finder means S₃ of FIG. 7, and in the optical device O₃ the reflecting surface 12 of the first reflector means takes the form of a convex reflector 27, while the second reflector means has its reflecting surface 13 provided also by a concave reflector 12 which provides a sharp image of the scales for the eye of the operator. The convex reflector 27 will provide an enlarged image of the scales.

Figure 8:
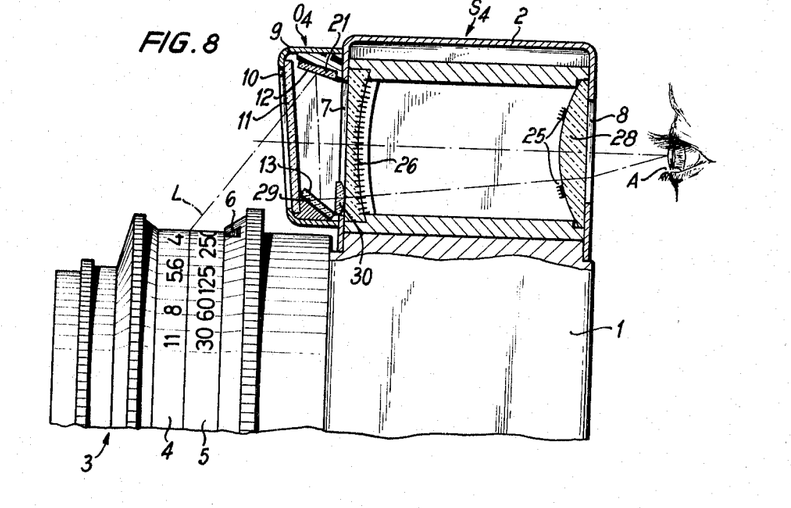

The camera which is shown in FIG. 8 includes a viewfinder means S₄, which differs primarily from the viewfinder S₃ in that this viewfinder of FIG. 8 provides an optical reduction of the image. The viewfinder of FIG. 8 is provided at the rear window 8 with a finder ocular 28 which carries at its convexly curved inner surface the frame 25. In this case also this frame 25 is imaged by a partly transparent concave reflector mounted on the inner surface of the finder objective, so that this concave reflector 26 will provide in the viewing field frame-limiting images. The viewfinger S₄ is provided at its front end with the optical structure O₄ of the present invention, and this optical structure has also the first reflecting means provided with the reflecting surface 12 of a flat mirror 21, while the second reflector means has the reflecting surface 13 which in this case is also provided by a flat mirror 29. In order to provide in this case also a sharp image of the scales for the eye of the operator, there is situated between the reflector 29 and the rear window 8 a magnifying lens 30.

Figure 9:
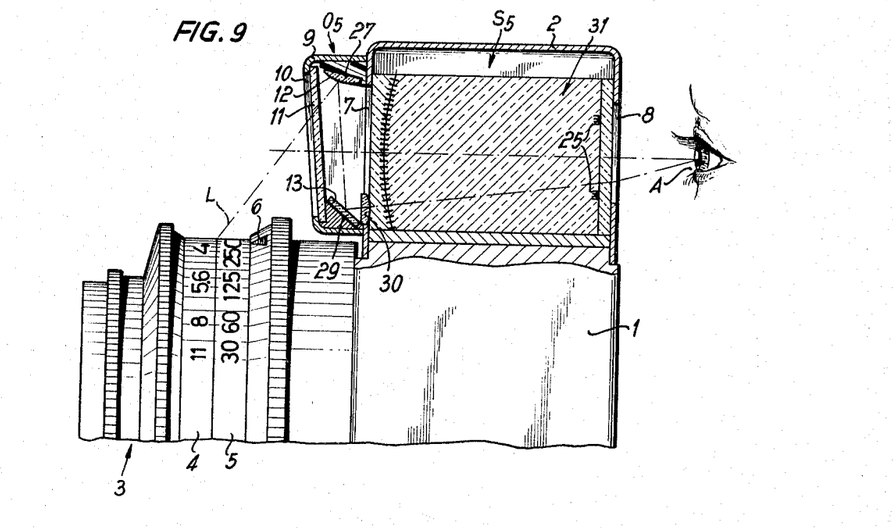

The camera of FIG. 9 is provided with a viewfinder means S₅ which in principle is generally the same as the viewfinder S₃. In the viewfinder of FIG. 9 the optical viewfinder elements are cemented together to form a block 31. The optical device O₅ of the invention is carried by the viewfinder of FIG. 9 at the front end thereof and includes the enlarging of the reflector 27 which provides the reflecting surface 12 of the first reflector means and the flat reflector 29 which provides the reflecting surface 13 of the second reflector means, this structure also including the lens 30 for providing a sharp image of the scales.

Figure 10:
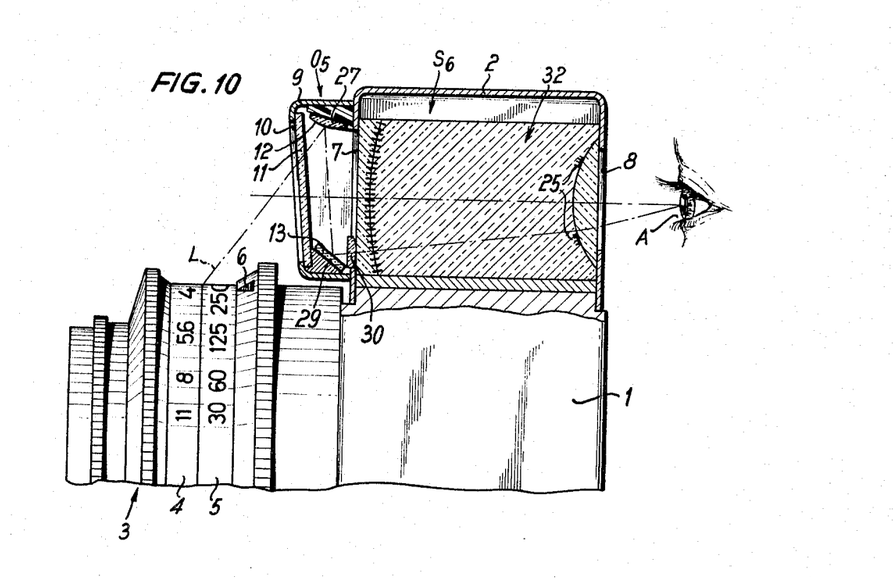

The camera shown in FIG. 10 is provided with a viewfinder means S₆ which corresponds primarily with the viewfinder S₅. However, in the embodiment of FIG. 10 the frame 25 is located on a convexly curved surface, but here again all of the optical elements are cemented together to form a block 32. The optical device of the invention provided for the viewfinder of FIG. 10, is the same as that of FIG. 9 and is also designated by the same reference characters O₅.

Figure 11:
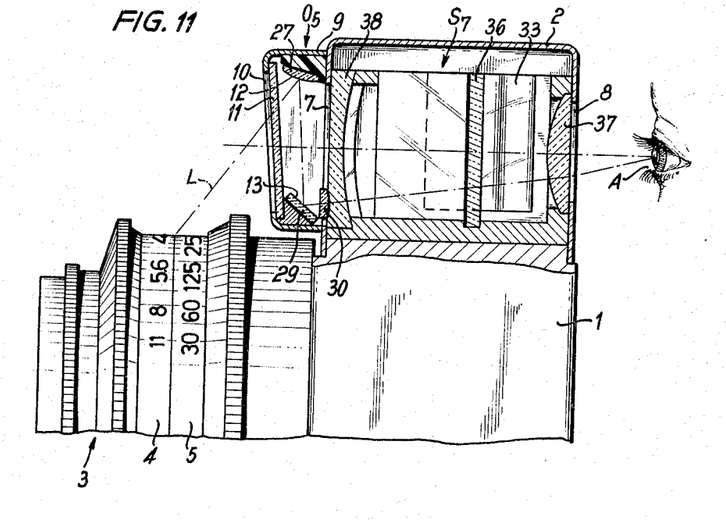
Figure 12:
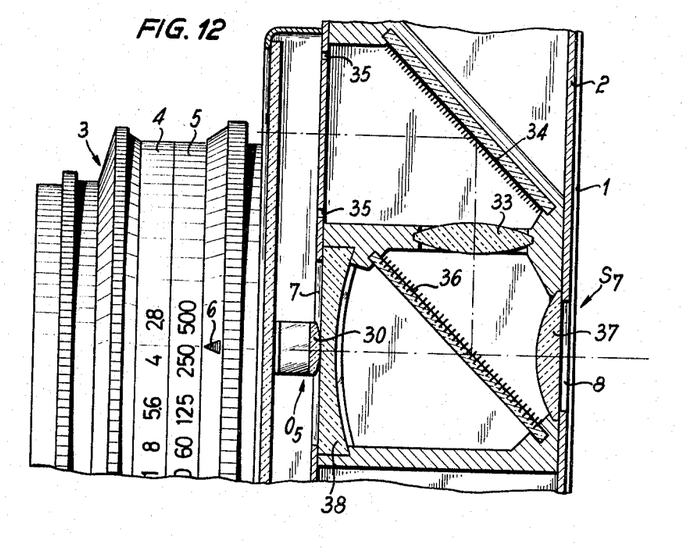
FIG. 12 is a fragmentary sectional top plan view of the structures of FIG. 11, FIG. 12 having the sectional portion thereof taken beneath the top wall of the viewfinder.

The camera shown in FIGS. 11 and 12 has a viewfinder means S₇ in which, in a known way, the framing limits 35 have their images projected laterally into the viewfinder by a reflector 34. The framing limits 35 may be in the form of suitable slots formed in a front plate of the viewfinder, and the light which passes through these slots will be reflected by the mirror 34 or the like through the condenser lens 33 to the semi-transparent reflector 36 into the path of light in the viewfinder. The viewfinder S₇ has an ocular 37 and an objective lens 38. The optical device O₅ of FIGS. 9 and 10 is also provided for the structure of FIGS. 11 and 12.

As is apparent from the above description, the structure of the present invention can be used with widely different types of viewfinders without providing any significant modification in the structure which provides the scale images in accordance with the present invention. Any one of the optical devices O₁-O₅ can be used with any one of the viewfinders S₁-S₇. In each case all of the parts of the structure of the invention will be situated in front of the viewfinder and do not require any increase in the height of the space occupied by the camera structure, either in an upward or in a downward direction. Furthermore, the structure of the invention does not in any way limit the viewing field.

Figure 13:
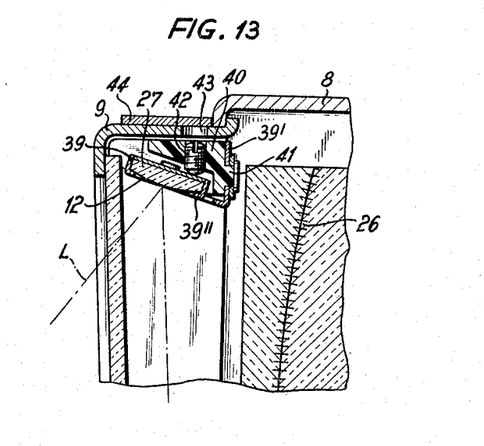
FIG. 13 is a fragmentary sectional elevation showing the upper front portion of a viewfinder in cooperation with the structure of the invention, this structure being provided for adjusting the reflector shown in FIG. 13.
Figure 14:
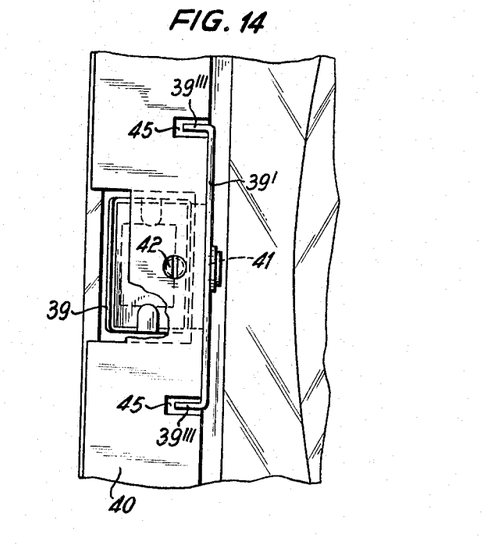
FIG. 14 is a fragmentary plan view of the structure of FIG. 13.

In order to be able to adjust the optical structure of the present invention in a simple way, the first reflector means can be mounted in an adjusting and fixing structure as shown in FIGS. 13 and 14. Thus, the convex reflector 27 which provides the reflecting surface 12 of the first reflector means can in this case be situated in a suitable mounting 39 made of a springy yieldable material such as a suitable plastic. This mounting or carrier 39 is supported on a holder 40 which is fixedly mounted in the housing 9 and which is provided with a pin 41 which has an axis which is parallel to the axis of the viewfinder. The mounting 39 is formed at a portion 39' with an opening through which the pin 41 extends so that in this way the first reflecting means can be tilted about an axis parallel to the optical axis in the same plane as that in which the adjusting rings 4 and 5 turn. By upsetting the pin 41 the free turnability of the portion 39' of the mounting 39 can be frictionally resisted, so that the first reflector means can be maintained at any adjusted angle about the pin 41. Thus, by turning the mounting about the pin 41, the reflector 27 can be directed toward the portions of the scales whose image is to be directed to the eye of the operator. In order also to provide an adjustment which is substantially perpendicular to the axis of the pin 41, the holder 40 is provided with a threaded aperture which receives an adjusting screw 42 accessible through an opening 43 in the housing 9. Due to the inherent resiliency of the mounting 39 it presses against the bottom end of the screw 42 which can be turned so as to deflect the reflector 27 to a selected angular position. In this way, the entire reflector 27 can be turned upwardly or downwardly about an axis perpendicular to the axis of the pin 41. Deformation of the mounting 39 will at this time take place at the region 39" thereof situated between the reflector 27 and the portion 39'. The opening 43 of the housing 9 can be covered by a plate 44 which can be glued on to the housing 9.

In order to fix the first reflecting means in its adjusted position, the portion 39' of the mounting 39 is provided at its ends with forwardly directed tongues 39''' which are respectively received in openings 45 of the holder 40, and a drop of a suitable adhesive material can be deposited in each of these openings to set about the tongues or lugs 39''' so as to fix the latter and thus maintain the first reflector means in its adjusted position.

The optical structure of the present invention can also be combined with other types of viewfinders. Moreover, the reflecting surfaces of the first and second reflecting means can take the form of a relatively small reflecting prism instead of the illustrated mirror. In addition, it is possible to provide images of further scales which are mounted on the objective assembly. For example, a scale showing the distance between the object and the camera and having suitable depth of field indications can have its image projected in the above described manner to the eye of the operator simultaneously with the viewing of the object through the viewfinder. Furthermore, the viewfinder need not necessarily be situated precisely over the objective. It can, as shown in FIG. 4 be laterally displaced with respect to the objective. In this latter case the reflecting surfaces of the optical device of the invention would be correspondingly displaced so as to direct the scale images to the eye of the operator.

All of the above-described structure and shown in the drawings, in all of its constructive details, can be combined together in any desired combination, in accordance with the present invention.

What is claimed is:

1. A camera comprising a camera housing having a front wall, objective means carried by and projecting forwardly from said front wall of said housing, scale means carried by said objective means for setting the latter and for indicating the settings of said objective means, viewfinder means carried by said camera housing and having an optical axis beneath which said objective means is located, said viewfinder means being situated rearwardly of and at an elevation higher than said objective means, and having a front window through which light enters said viewfinder means and a rear window through which the operator looks into said viewfinder means, a second housing carried by said viewfinder means at the exterior thereof and in front of said front window thereof, said second housing having a hollow interior rearwardly limited by said front window of said viewfinder means and said second housing having distant from and in alignment with said front window of said viewfinder means an entrance window through which light enters said second housing to reach said front window of said viewfinder means and enter the latter, first reflector means carried by said second housing in the interior thereof and at an edge of said front window and at an elevation higher than said optical axis of said viewfinder means for directing an image of said scale means downwardly across the interior of said second housing and said optical axis of said viewfinder means, and second reflector means carried by said second housing in the interior thereof and at an edge of said front window and beneath said optical axis of said viewfinder means for receiving said image from said first reflector means and for directing said image through said front and rear windows of said viewfinder means to the eye of the operator so that the operator, when looking through the viewfinder means, will see an image of said scale means whereby simultaneously with the viewing of the object to be photographed the operator will see the settings of said objective means.

2. A camera as recited in claim 1 and wherein part of the viewing field of said viewfinder means is obstructed by said objective means, said second reflector means directing the image of said scale means to said part of said field which is obstructed by said objective means.

3. A camera as recited in claim 1 and wherein at least one of said reflector means is in the form of a flat reflector.

4. A camera as recited in claim 1 and wherein said first reflector means is in the form of a convex reflector.

5. A camera as recited in claim 1 and wherein said second reflector means is in the form of a concave reflector.

6. A camera as recited in claim 1 and wherein an adjusting means is operatively connected to said first reflector means for adjusting the position thereof, and means operatively connected to said first reflector means for fixing the latter in its adjusted position.

7. A camera as recited in claim 6 and wherein said adjusting means supports said first reflector means for adjustable movement in a plane parallel to that in which said scale means is movable.

8. A camera as recited in claim 6 and in which said adjustable means supports said first reflector means for movement in a plane perpendicular to that in which said scale means is movable.

9. A camera comprising a camera housing having a front wall, objective means carried by and projecting forwardly from said front wall of said housing, scale means carried by said objective means for setting the latter and for indicating the settings of said objective means, viewfinder means carried by said camera housing and having an optical axis beneath which said objective means is located, said viewfinder means being situated rearwardly of and at an elevation higher than said objective means, and having a front window through which light enters said viewfinder means and a rear window through which the operator looks into said viewfinder means, first reflector means carried by said viewfinder means at an edge of said front window thereof and at an elevation higher than said optical axis of said viewfinder means for directing an image of said scale means downwardly across said optical axis of said viewfinder means, and second reflector means carried by said viewfinder means at an edge of said front window thereof and beneath said optical axis thereof for receiving said image from said first reflector means and for directing said image through the rear window of said viewfinder means to the eye of the operator so that the operator, when looking through the viewfinder means, will see an image of said scale means so that simultaneously with the viewing of the object to be photographed the operator will see the settings of said objective means, and a frame-limiting means providing in the viewing field of said viewfinder means framing limits separated by interruptions situated between said framing limits, said second reflector means directing the image of said scale means to one of said interruptions.

10. A camera comprising a camera housing having a front wall, objective means carried by and projecting forwardly from said front wall of said housing, scale means carried by said objective means for setting the latter and for indicating the settings of said objective means, viewfiinder means carried by said camera housing and having an optical axis beneath which said objective means is located, said viewfinder means being situated rearwardly of and at an elevation higher than said objective means, and having a front window through which light enters said viewfinder means and a rear window through which the operator looks into said viewfinder means, first reflector means carried by said viewfinder means at an edge of said front window thereof and at an elevation higher than said optical axis of said viewfinder means for directing an image of said scale means downwardly across said optical axis of said viewfinder means, and second reflector means carried by said viewfinder means at an edge of said front window thereof and beneath said optical axis thereof for receiving said image from said first reflector means and for directing said image through the rear window of said viewfinder means to the eye of the operator so that the operator, when looking through the viewfinder means, will see an image of said scale means so that simultaneously with the viewing of the object to be photographed the operator will see the settings of said objective means, and adjusting means operatively connected to said first reflector means for adjusting the position thereof, and means operatively connected to said first reflector means for fixing the latter in its adjusted position, said adjusting means including a stationary pin having an axis parallel to the optical axis of said viewfinder means, a carrier made of a springy, yieldable material, said carrier carrying said first reflector means and being carried by said pin for turning movement about the axis thereof, and screw means engaging said carrier for deflecting the latter in a direction substantially perpendicular to the axis of said pin.

References Cited

FOREIGN PATENTS 539,267    5/1959    Italy.

JOHN M. HORAN, *Primary Examiner.*